W. A. CASWELL.
TRUCK.
APPLICATION FILED JUNE 1, 1915.
1,215,342.
Patented Feb. 13, 1917.
6 SHEETS—SHEET 4.
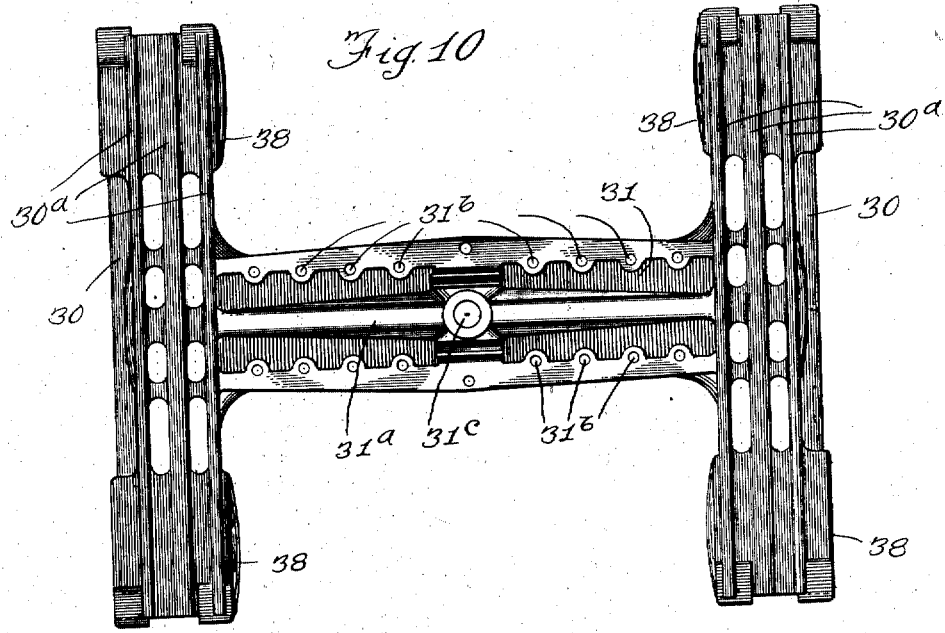
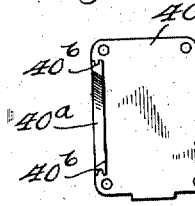
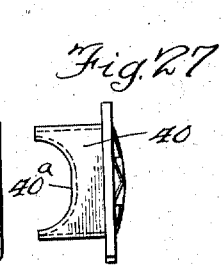
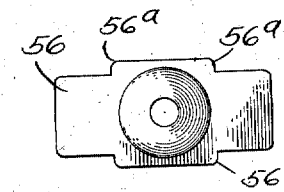
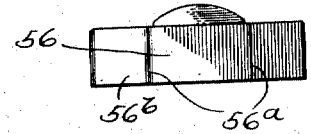
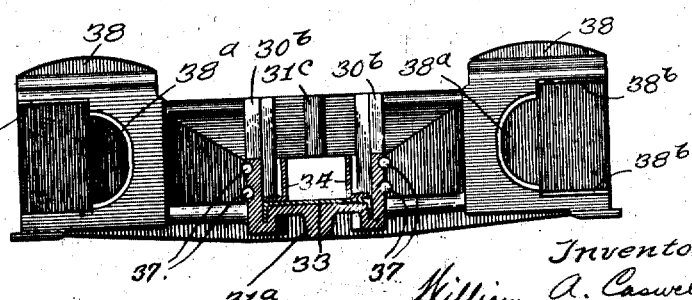

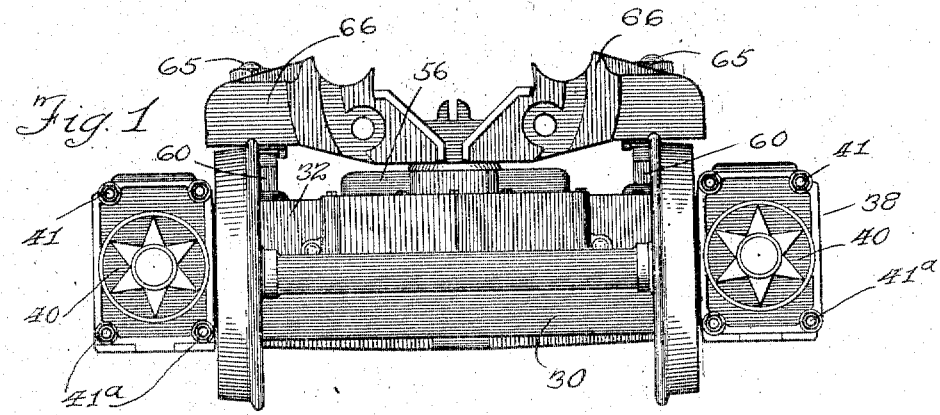
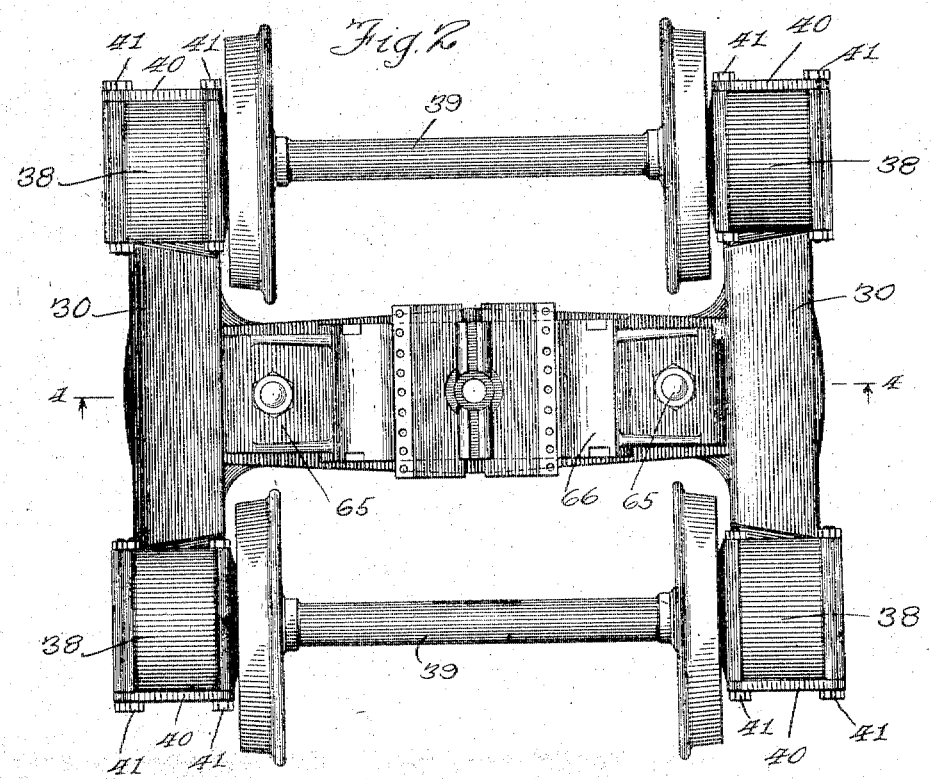

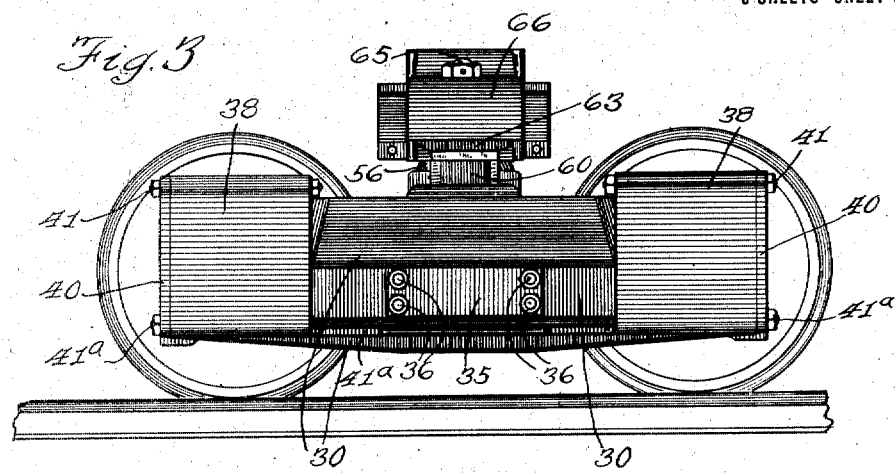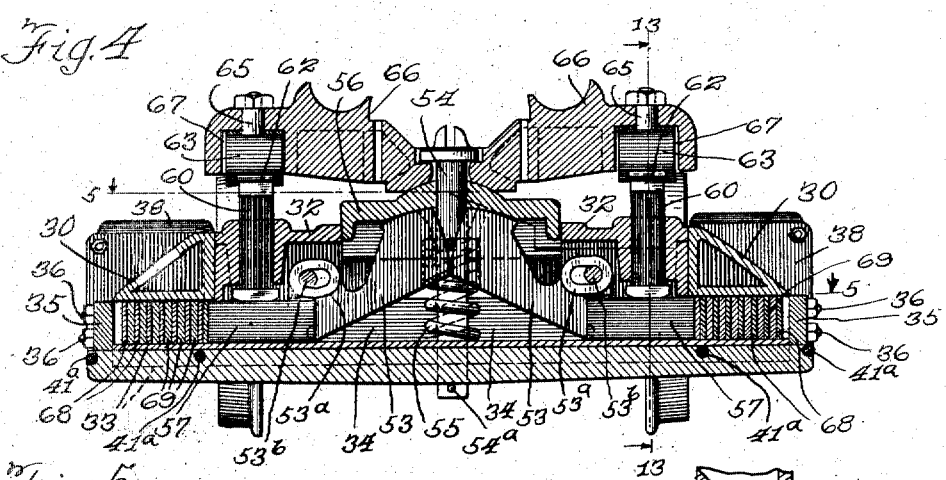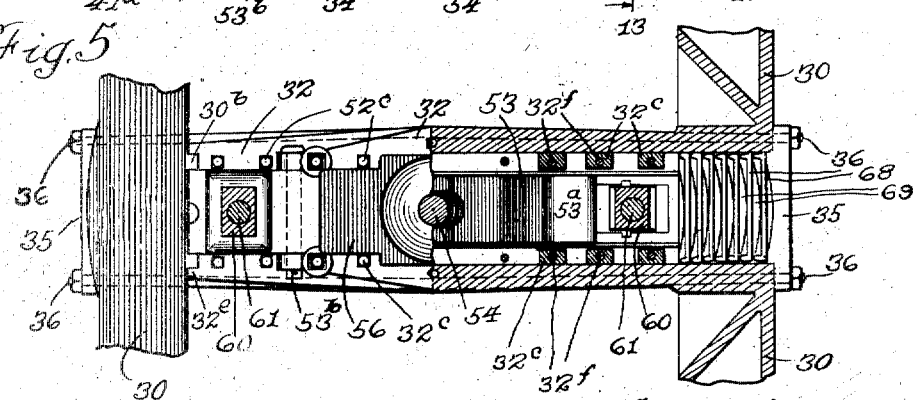

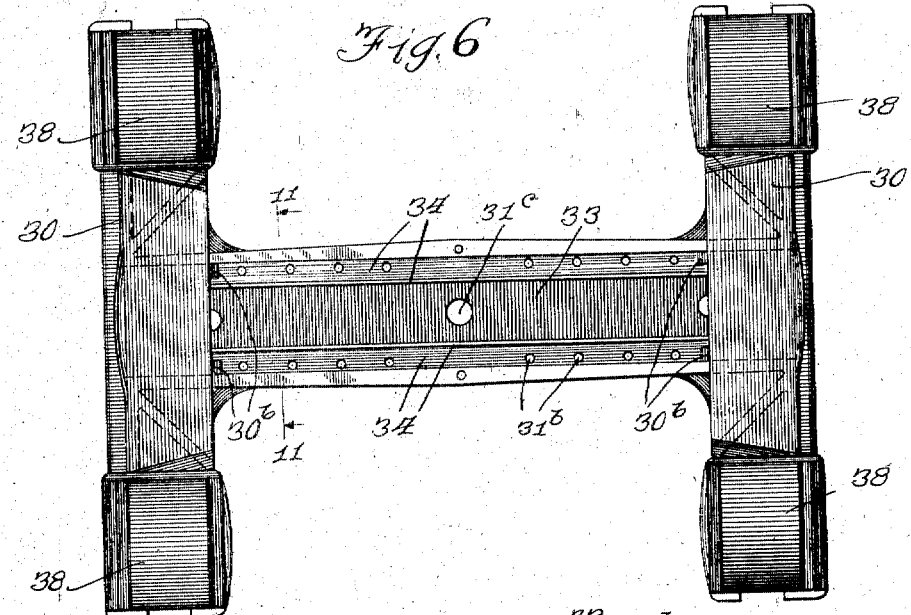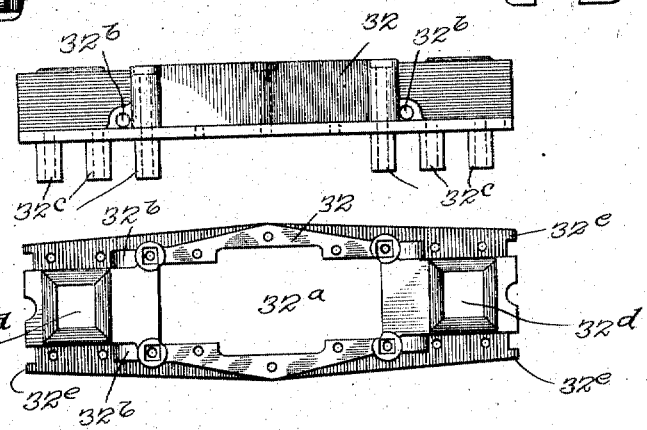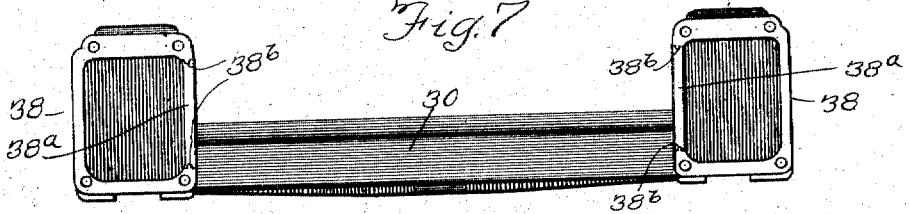

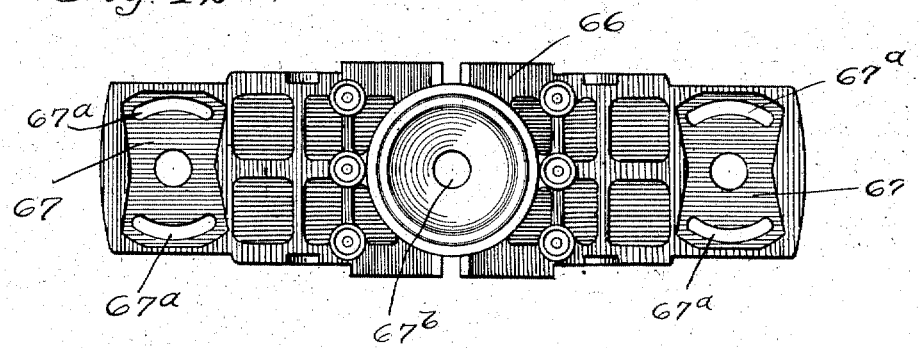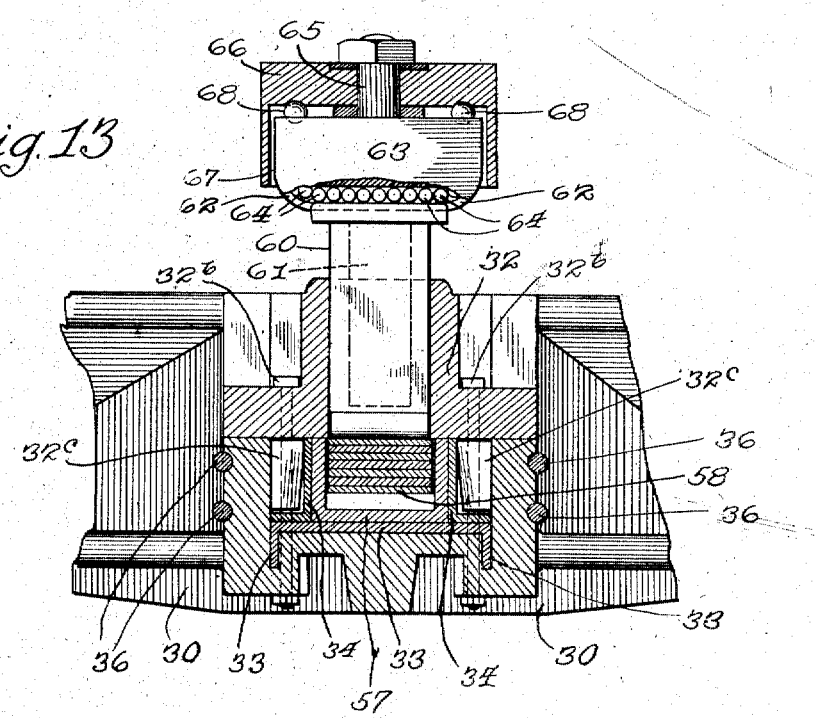

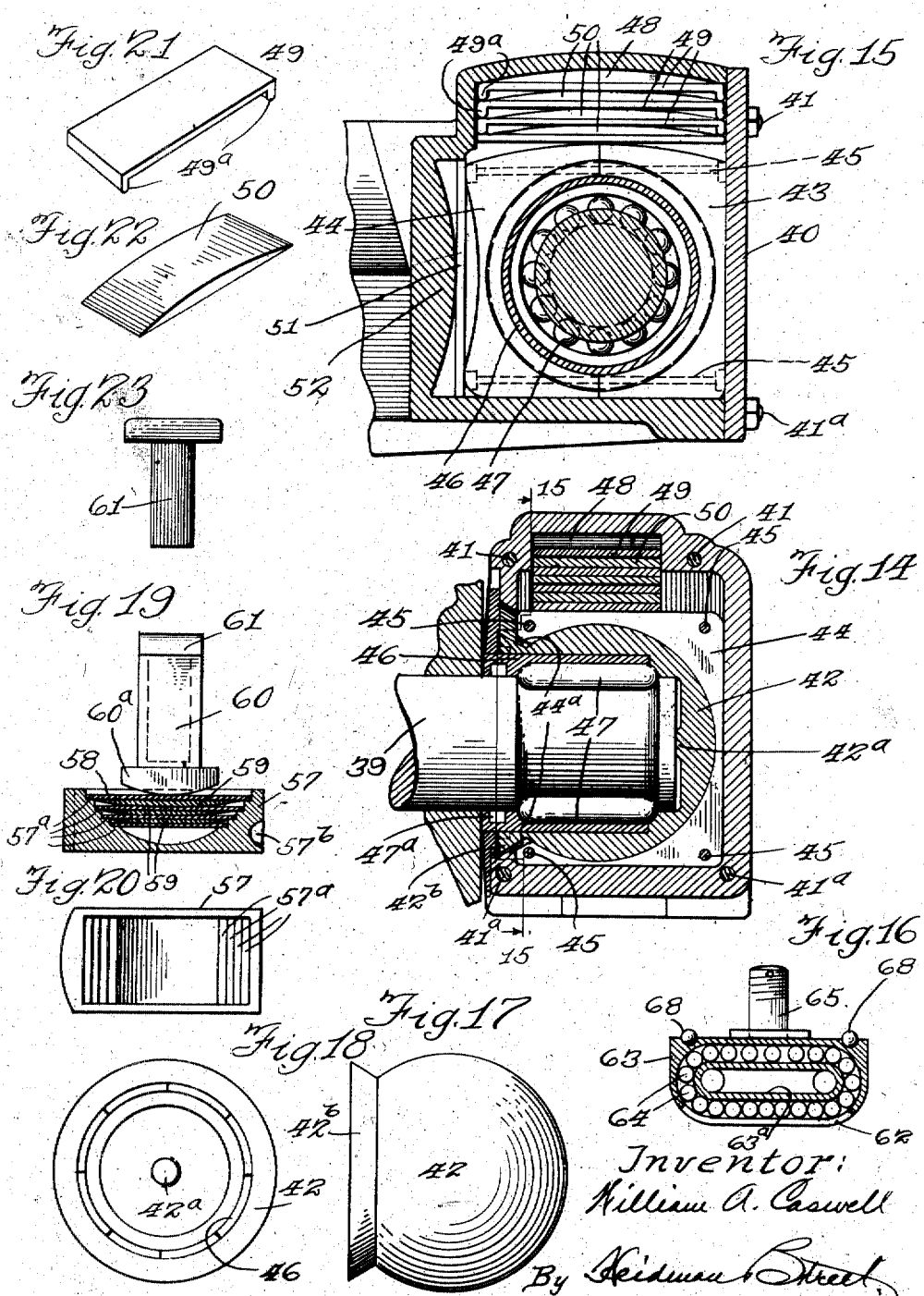

UNITED STATES PATENT OFFICE.

WILLIAM A. CASWELL, OF CHICAGO, ILLINOIS.

TRUCK.

1,215,342.  Specification of Letters Patent.  Patented Feb. 13, 1917.

Application filed June 1, 1915. Serial No. 31,468.

*To all whom it may concern:*

Be it known that I, WILLIAM A. CASWELL, a citizen of the United States, and resident of Chicago, in the county of Cook and State of Illinois, have invented certain new and useful Improvements in Trucks, of which the following is a description, reference being had to the accompanying drawings, which form a part of my specification.

My invention relates to trucks intended for use in connection with railway cars, and has for its object the provision of a construction wherein the usual transoms, wheel-sides and journal housings are made integral so as to form a single unit; the truck being made of suitable material as, for example, either cast steel, malleable iron, or steel plate.

Another object of my invention is to provide a construction possessing greater strength and durability than the constructions at present in use, and therefore requiring less attention and repair, with the result that more continuous service may be had.

Another object of my invention is to provide a truck adapted to distribute the strains and shocks and provide a yielding or cushioning relation with the underframe of the car without directly carrying the load on the cushioning means as has been the case in constructions heretofore used.

The invention also contemplates providing the transom or cross-girder portion of the truck with a steel column or element composed of a steel channel and angle irons cast integral therewith, so that the transom or cross-girder portion will not only be reinforced, but a bearing surface or run-way will be provided for a portion of the cushioning means for the load-carrying members above referred to.

Another object of my invention is to provide a truck wherein the journal-housings are adapted to receive a combination ball and roller journal bearing of such construction that the use of brasses, waste or oil lubrication will be eliminated and the difficulties encountered in connection with such practice will be practically obviated.

The invention contemplates a construction which may be readily assembled; and wherein the various parts are readily accessible for repair and the like; the invention possessing other advantages not hereinbefore enumerated, but which will be apparent from the following detailed description, and other features which will be hereinafter set forth.

In the drawings:—

Figure 1 is a front elevation of my improved truck, with the various parts assembled and ready to receive the center sill of the car underframe.

Fig. 2 is a top plan view thereof.

Fig. 3 is a side elevation of my improved truck.

Fig. 4 is a cross sectional view in elevation through the center of the truck taken on the line 4—4 of Fig. 2.

Fig. 5 is a transverse section in elevation of the transom or cross-girder portion of my improved truck, taken on the line 5—5 of Fig. 4, looking in the direction of the arrows.

Fig. 6 is a top plan view of the truck frame.

Fig. 7 is a side elevation, or wheel-side, of the truck frame.

Fig. 8 is a side elevation of the cover-section of the truck frame.

Fig. 9 is a top plan view of the cover-section shown in Fig. 8.

Fig. 10 is a bottom view of the truck frame.

Fig. 11 is a cross sectional view, taken on the line 11—11 of Fig. 6, looking in the direction of the arrows.

Fig. 12 is a bottom plan of the bolster.

Fig. 13 is a vertical sectional view through the bolster, truck-frame and side bearing, taken on the line 13—13 of Fig. 4, looking in the direction of the arrows.

Fig. 14 is a vertical sectional view, taken through one of the journal-housings, with the journal broken away, illustrating my improved journal-bearings.

Fig. 15 is a vertical sectional view taken on the line 15—15 of Fig. 14, looking in the direction of the arrows.

Fig. 16 is a detail sectional view of a portion of the side bearing.

Fig. 17 is a detail view of the ball bearing for the journals, shown in side elevation.

Fig. 18 is an end or front view thereof.

Fig. 19 is a partial sectional view and elevation of a portion of the side bearing.

Fig. 20 is a plan view of the car or holder for the cushioning means of the side-bearing.

Fig. 21 is a perspective view of one of the spring plates employed in the journal-housing as shown in Fig. 15.

Fig. 22 is a perspective view of one of the follower plates or pressure-applying members of the cushioning means, as employed either in the journal housing, as shown in Figs. 14 and 15, or at the sides of the spring-plate car or holder of the side-bearing, as shown in Fig. 5.

Fig. 23 is a detail view of the spindle which extends into the pressure-column of the side-bearing.

Fig. 24 is a top plan view of the center-plate.

Fig. 25 is a side view thereof.

Fig. 26 is a detail view of the journal-housing section or cap-portion, secured at the wheel-side and end of the housing.

Fig. 27 is a side elevation thereof.

In the particular exemplification of my invention, the main or frame-portion of the truck consists of two parts or pieces; namely the lower portion of the frame being one piece, while the cover-plate constitutes the other. The wheel-sides 30, 30 and the cross-girder 31 are cast or formed integral, as more clearly shown in Figs. 6 and 10, constituting what I have termed the lower portion of the frame. The cross-girder is adapted to receive the separate unit or cover-section 32, shown in Figs. 8 and 9, and which constitutes the other or second part or piece.

The cross-girder portion 31 of the truck frame, like the wheel-side portions, may be made either of cast steel, malleable iron or steel plate drawn into the required form by well known methods at present in use; the cross-girder portion being preferably provided with a flanged member or steel channel 33, as shown in Figs. 4 and 11, extending longitudinally throughout the length of the girder and substantially across the wheel-sides 30, 30, as can be seen in Fig. 4. The steel channel 33 is preferably cast into the girder-portion with the flanged sides presented downwardly, see Figs. 4, 11 and 13, so as to provide a smooth, flat upper surface adapted to receive certain portions of the cushioning means or pressure-distributing means hereinafter to be described.

The channel 33 has a pair of angle irons 34, 34, secured thereto, by suitable rivets or otherwise, along opposite sides of the channel 33 and extending longitudinally of the cross-girder 31; the angle irons 34 being so secured as to present the main or long portion upwardly, as more clearly shown in Figs. 11 and 13; the angle-irons preferably extending intermediate of the wheel-sides 30. The channel 33, with the angle-irons 34, provide a suitable chamber or slide-way for the anti-friction cushioning means above referred to.

The underside of the wheel-sides 30, 30 of the truck-frame are shown provided with suitable reinforcing ribs 30ª, and the under side of the cross-girder 31 is also shown provided with a heavy reinforcing web 31ª extending throughout the length of the cross-girder, see Fig. 10. The longitudinal sides of the cross-girder 31 are provided with a suitable number of properly spaced bolt-holes 31ᵇ, see Fig. 10, adapted to receive bolts whereby the cover-member 32, shown in Figs. 8 a 1 9, is secured in place; the cross-girder 31, at the central point, being provided with the king-pin opening 31ᶜ, see Figs. 6 and 10.

As shown in Fig. 11, the truck-frame is cast so as to provide the channel or chamber extending longitudinally through the cross-girder 31 and transversely through the wheel-sides 30, 30, see Fig. 11, so as to provide openings at opposite sides of the truck to permit of the insertion of the cushioning means above referred to. The ends of the channel or chamber, after the cushioning means or bearings have been inserted, are intended to be closed by the cover-plates 35, 35, see Figs. 3, 4 and 5; the plates are held in place by the bolts or rods 36 which extend through bolt-holes 37 and transversely through the frame from side to side, see Figs. 3, 5 and 11. The bolts or rods 36 preferably extend along in grooves formed in the cross-girder, and in addition to holding the cover-plates 35 in place these bolts constitute truss-rods or safety rods for the truck-frame.

The journal-housings 38 are so formed as to have their outer sides, namely the sides at right angles to the journal 39, closed by an integral wall, as can be seen in Figs. 3 and 11; while the inner or wheel-sides of the housings are formed with a partial wall having the semi-elliptical opening 38ª, see Fig. 11, adapted to receive the end of the journal 39. The openings 38ª terminate in enlargements, as shown in Fig. 11, adapted to receive the journal-housing sections or caps 40, disclosed in Figs. 26 and 27. The front ends of the journal-housings are left open, as shown in Fig. 7. The inner end of the portion of the cap or journal-housing section 40, adapted to close the enlarged opening in the housing, as shown in Fig. 11, is also provided with a semi-elliptical formation or cut-out portion, as indicated at 40ª, see Fig. 27, so as to fit about the ends of the journals 39. This journal-fitting portion or wall of member 40 is also provided with grooves 40ᵇ, 40ᵇ at the top and bottom edges, see Fig. 26, these grooves being intended to receive the tongues 38ᵇ, 38ᵇ on the inner or wheel-side wall of the journal-housings, at the upper and lower ends of the enlarged openings, see Figs. 7 and 11. The portion or wall 40ᵃ, of the section or cap 40, adapted to fit about the journal, is arranged near one side of the other portion or wing of cap 40, so as to permit said portion or wing to extend entirely across the open front end of the journal-housing, as shown in Figs. 1, 2 and 3.

The cover or caps 40 are secured in place by means of the bolts 41, extending through the four corners thereof, with the bolts 41ᵃ at the lower corners preferably adapted to extend entirely through the housings and lengthwise of the wheel-side of the frame, as shown in Fig. 3, thereby not only securing the cover-sections or caps 40 at both ends of the same wheel-side, but also providing a connecting link or truss for reinforcing the wheel-sides of the truck.

The journal-housings 38 are formed to receive the ball-member or bearing 42, see Figs. 14, 17 and 18. The spherical member or ball 42 is made hollow to receive the end of the journal 39; and the inner wall, adjacent the end of the journal, is preferably provided with a center lug or thrust-portion 42ᵃ, see Figs. 14 and 18, which is adapted to extend into the depression formed at the ends of the journals when the latter are being machined or turned true.

The spherical members or balls 42 are properly held in the journal-housing 38 by means of a suitable cup or bisected block, having a spherical socket or chamber, as shown in Fig. 14, composed of the portions 43 and 44, see Fig. 15. As shown, the two halves 43 and 44 fit about the ball-bearing 42, so as to permit the flange-portions 42ᵇ (shown in Fig. 17) of the ball or spherical member 42 to protrude. The flange 42ᵇ is preferably provided for the purpose of preventing dirt, etc., entering the ball-receiving chamber; if desired, the flange 42ᵇ may be omitted. When the ball-member 42 is formed with the flange 42ᵇ, sufficient play between it and the socket-member should be provided, as shown at 44ᵃ in Fig. 14, in order to permit the ball-member 42 to have oscillatory movement in the socket-member, thus allowing movement of the journal in the journal-housing resulting from unevenness in the track. With this oscillatory movement, it is evident that the journal and journal-housing will not be subjected to the strains caused by the teetering action of the truck, and, therefore, the bearings, to wit sleeve-member 46 and roller-bearings 47, will also not be cramped. The two portions or halves 43 and 44 are bolted together by means of the rods or bolts 45, 45 see Fig. 15.

The opening in the ball-bearing member 42 is made sufficiently large to receive the sleeve 46, whereby the roller-bearings 47, see Figs. 14 and 15, are held in contact with the reduced end of the journal 39, as shown in Fig. 14. The sleeve 46 is preferably so secured within the ball member 42 as to prevent rotation of the sleeve in the ball-bearing member 42; in other words, to prevent rotation of the sleeve 46 with the journal. The sleeve 46, at its outer end, is preferably provided with a groove 47ᵃ, see Fig. 14, adapted to receive suitable means or packing to prevent dirt working its way into the bearings within the sleeve.

The journal-housings 38 are formed so as to provide a spring-receiving chamber or pocket, shown at 48. In the preferred form of the invention, I employ a series of spring-members or plates 49 arranged transversely of the journal-housings, as shown in Fig. 15, and also of a width commensurate with the width of the chamber or pocket 48, as shown in Fig. 14. The cushioning means, located in the upper part of the journal-housings, is adapted to take up vertical movement or motion; and preferably comprises the spring-plates 49, formed as shown in Fig. 21, with their ends bent or provided with the lug-portions 49ᵃ, whereby the spring-members or plates 49 will maintain a proper spaced relation. Arranged intermediate of the spring-plates or members 49, are follower plates 50, having a flat side, as shown, to rest upon the flat surface of the spring-plate or member 49 immediately beneath, while the upper surface of the follower member 50 is convex, as more clearly shown in Fig. 22. This convexed or arcuate surface is intended to bear against the lower side of the spring-plate or member 49 arranged immediately above, and at a point intermediate of the ends thereof, thus causing the pressure to be transmitted or taken up by the various plates of the series. The lowermost spring-plate 49 of the series need not be provided with the bent portions or lugs 49ᵃ,—being preferably in the nature of a flat steel plate,—as shown in Fig. 15, and has its central portion resting upon the upper curved surface of the cage or socket-forming blocks 43 and 44, as shown in Fig. 15.

The vertical side of the inner cage-block 44 is made concaved, as shown in Fig. 15, and has contact with the steel plate or cushioning member 51, see Fig. 15; the steel plate or cushioning member 51 fitting intermediate of the inner socket-block 44 and the inner wall of the journal-housing 38. The inner wall of the housing is convexed or arched, as shown at 52 in Fig. 15, so as to bear against the central portion of cushioning means or plate 51, which is permitted to flex by reason of the concave side of cage-block 44. The spring-plate 51 provides an inertia and cushioning means adapted to take up the momentum due to the starting and stopping of the train, so that the blows or thrusts will be taken off the journals and the action of the housings minimized. In the illustration, I have shown a single plate or member 51, but it will be understood that two or more spring-plates may be employed, if desired.

Mounted on the cross-girder 31 are a pair of cams or fulcrum levers 53, the inner or abutting ends whereof are curved, as shown in Fig. 4, so that the ends may rock upon each other when forced downwardly out of the normal position shown in Fig. 4. The inner abutting arcuate ends of the fulcrum levers 53 are grooved or hollowed out to provide a suitable passage for the king-pin or bolt 54 as well as the upper end of the lift or coil spring 55, see Fig. 4. The lower end of the lift or coil-spring 55 bears against the channel 33 in the cross-girder, while the upper end bears against shoulders on the upper end of the enlarged portion of the grooves formed in the abutting ends of the fulcrum levers 53, as shown in Fig. 4. The spring 55 is made of sufficient strength to maintain the cams or fulcrum levers 53 in the normally inclined or upward position shown in Fig. 4. The king-pin 54 is made of sufficient length to extend through the cross-girder, as shown in Fig. 4; the lower end of the king-pin being shown provided with a hole 54$^a$ adapted to receive a suitable cotter pin to prevent the accidental disassembling of the various members or parts of the center-bearing.

The upper surfaces of the cams or fulcrum levers 53 are also preferably made arcuate, to bear against the inner curved surface of the center-plate 56, see Fig. 4. The center-plate 56 is preferably formed, as shown in Figs. 24 and 25, so as to provide the shoulders 56$^a$, which, with the depending sides 56$^b$, see Figs. 4 and 25, permit the center-plate to fit into the opening 32$^a$ of the cover-section 32 of the truck-frame, see Fig. 9; the enlarged sides of the center-plates, whereby the shoulders 56$^a$ are formed, will fit into the enlarged portion of the opening 32$^a$ of the cover-section 32, thus permitting the center-plate to move vertically but at the same time hold it against transverse movement.

The outer ends of the cams or fulcrum levers 53 are shown provided with lobes 53$^a$ having elongated holes adapted to receive the guide-pins 53$^b$ which also extend through the holes in the lobes 32$^b$ formed in the cover-section or member 32 of the truck-frame, see Fig. 8.

The cover-plate section 32 is provided with a suitable number of depending extensions 32$^c$ adapted to maintain the cover-plate in its proper spaced relation to the cross-girder 31, so as to provide space or play for the cams or fulcrum levers 53 of the center-bearing and sufficient space or play for the other cushioning means which I employ to receive the thrust of the cams or fulcrum levers, hereinafter to be described.

The extensions 32$^c$ are shown provided with bolt-receiving holes adapted to be brought into register with the bolt-receiving holes 31$^b$ of the cross-girder, see Figs. 6 and 10, and receive the bolts 32$^f$.

The ends of the cover-section 32 are shown provided with the rectangular openings 32$^d$, 32$^d$; and preferably also with the lugs 32$^e$ adapted to fit about shoulders 30$^b$ cast on the inner side of the wheel-sections 30 of the truck-frame, see Fig. 5.

Mounted on the truck-frame, namely on the smooth surface afforded by the channel-iron 33, and between the upwardly presented legs or sides of the angle-irons 34, so as to permit sliding movement transversely of the truck, are a pair of spring-plate holding members or carriers 57, 57, see Figs. 4 and 13, and shown in detail in Fig. 19. The members or carriers 57 are preferably somewhat in the nature of a box with a flat bottom, as shown in Figs. 13 and 19; the interior side walls being preferably terraced or stepped, as shown at 57$^a$, Fig. 19, so as to provide supporting ledges for the steel spring-plates or cushioning means 58. Any suitable number of plates 58 may be employed that will give sufficient cushion for the side-bearing. In order to distribute the pressure to each plate 58, I provide follower members or plates 59, which may be similar in construction to the followers 50 heretofore described. As the pressure will be applied from the top, the flat sides of the follower members 59 are presented upwardly, so that the arcuate surface will bear downwardly on the center of the spring-plates beneath. The carrier 57 has its interior hollowed out to a point beneath the lowermost terrace or ledge 57$^a$ in order to permit the lowermost plate 58 to flex at its center when pressure is applied to the bearing.

The top plate 58 receives the pressure-applying member or column 60, see Figs. 4, 13 and 19. The lower end of column 60 is shown provided with an enlarged bearing surface or head 60$^a$, which is preferably curved, as shown, so as to permit proper application of the downward pressure on the central portion of the top plate 58 to induce the latter to flex.

This enlarged portion or head 60$^a$ may be provided with one or more anti-friction rollers to bear on the top spring plate 58, or simply have the frictional contact shown, as the lateral movement of the carriers 57, due to the action of the cams or fulcrum levers 53, is not extensive.

The columns or members 60 are preferably rectangular in cross-section to fit the rectangular openings 32$^d$ in the cover member or section 32 of the truck-frame, see Figs. 4, 5 and 9.

The column 60 is provided with a socket extending lengthwise thereof, adapted to receive the spindle 61, see Figs. 5, 13, 19 and 23; the spindle 61 being free to rotate in the column 60. The upper end of spindle 61 is provided with a head, see Fig. 23, which is adapted to fit into the socket 62, formed in the under surface of the anti-friction bearing holder or cage 63, as more clearly shown in Figs. 13 and 16.

The anti-friction bearing holder or cage 63 is preferably of the construction more clearly shown in Fig. 16, wherein the interior is provided with an inner diaphragm or wall 63ª extending from side to side and spaced from the outer or main wall a distance sufficient to receive the anti-friction bearings 64, so as to provide a race-way wherein the anti-friction bearings 64 may move about in the continuous track formed intermediate of the inner wall or partition and the outer wall of the cage or holder; thus allowing a shifting of the anti-friction bearings and obviating the possible wear of any one portion of the bearings.

The holder of cage 63 is provided with an upwardly presented spindle 65 which is adapted to extend through a suitable opening in the bolster 66, as shown in Figs. 4 and 13.

The bolster 66 has the ends thereof provided with the pockets shown at 67 to receive the holder or cage 63 of the side bearings. The pockets are preferably formed of the peculiar shape illustrated in the bottom view of the bolster shown in Fig. 12, namely with the ends flared or enlarged, in order to permit swinging movement of the holders or cages 63, 63 in the angular manner due to movement of the truck; the holders or cages 63 being permitted to have movement independent of the bolster by reason of the spindles 65 which are made circular in cross-section.

I prefer to provide an anti-friction bearing between the top of the holders or cages 63 and the bottom of the bolster 66, as shown at 68, see Figs. 13 and 16. The bearings 18 are arranged in suitable grooves or depressions in the upper surface of the holders or cages 63 and in grooves or raceways 67ª formed in the under surface of the bolster 66, as clearly shown in Figs. 12 and 13; the bearings 68 being merely provided at the ends of the holders 63.

The central portion of the bolster 66 is provided with an opening 67ᵇ for the passage of the king-pin 54; and is also provided with a suitable circular surface, as shown in Fig. 12, to provide a proper bearing on the center-plate 56, as shown in Fig. 4. The bolster 66 is also shown provided with suitable surfaces or guide shoulders and bolt-receiving holes, whereby the center-sill of the car may be properly held and secured in place.

When the load, carried by the truck, is great enough to depress the bolster 66, the spring-plate members 58, mounted in the members or carriers 57, will be flexed through the action of the columns 60 of the side-bearings, and the rocking movement of the cams or fulcrum levers 53, against the action of spring 55, will cause the cams or fulcrum levers 53 to move the members or carriers 57 transversely of the truck, toward the wheel-sides thereof, as is clearly apparent from the construction, as illustrated in Fig. 4.

In order to guide or maintain the proper relation between the outer ends of the cams or fulcrum levers 53 and the housings or carriers 57, I show each lever 53 provided with a rounded lug or rib, shown in dotted lines in Fig. 4, which extends into the socket 57ᵇ, shown in Fig. 19.

In order to provide proper cushioning for the members or carriers 57, I arrange a series of spring-plates 68, see Figs. 4 and 5, in the ends of the chamber formed by the channel 33 and the angle-irons 34. The cushioning means or spring-plates 68 are preferably of the construction shown in Fig. 21, namely with angularly formed ends or lugs for properly spacing the spring-plates; and members or followers 69 are provided between the different spring-plates 68, see Fig. 5. These followers 69 are preferably of the construction, as shown in Fig. 22; the curved surfaces in the present instance being presented toward the outer sides of the truck. In order that the pressure may be applied in a proper manner on the respective spring-plates 68, a follower 69 may be arranged immediately adjacent the side of the member or carrier 57, or the side of the carrier or member may be provided with an arcuate surface similar to that of the followers, so as to contact with the central portion of the adjacent spring-plate 68. To permit proper flexing of the cushioning means, the cover-plate 35 is provided with a concave surface on the inner side, as shown at the right-hand end of Fig. 5; the cover-plate 35 merely being in normal contact with the opposite ends of the adjacent spring-plate 68.

The cushioning means composed of the spring-plates 68 and followers 69 are inserted in the chamber preferably from the outer ends thereof after the other parts of the truck have been assembled and put into place; the cover-plates 35 then being bolted against the sides of the truck to close the ends of the chamber.

As will be seen from the construction illustrated, I eliminate the use of the vertically disposed gravity coil-springs heretofore employed for directly carrying the load, and substitute a number of cushioning elements adapted to receive and distribute the pressure in different directions, without having the load directly carried by all of the cushioning elements, as has been the case in the type of trucks heretofore employed.

It is evident that the arrangement of the cushioning means employed in the upper part of the journal-housings, as shown in Fig. 15, and the cushioning means shown at the ends of the chamber for the traveling members or carriers 57, as well as other portions of the truck, may be altered in certain respects without departing from the spirit of the invention, and I do not wish to be understood, therefore, as limiting myself to the exact construction shown and described.

What I claim is:—

1. A truck composed of a unitary structure comprising wheel-sides, journal-housings and a cross-girder all formed integral, and independent reinforcing means embedded in and extending lengthwise of the wheel-sides and lengthwise of the cross-girder.

2. A truck formed of metal, with the wheel-sides, journal-housings and a cross-girder constituting a unitary structure; the journal-housings being provided with an integral outer side wall.

3. A truck wherein the wheel-sides, journal-housings and cross-girder form a metallic unit, with the cross-girder provided with an independent reinforcing flanged metallic member extending lengthwise of the cross-girder.

4. A truck comprising wheel-sides and a cross-girder cast integral, with the cross-girder provided with an independent reinforcing member extending from wheel-side to wheel-side and cast integral therewith.

5. A truck comprising metallic wheel-sides having journal-housings formed integral therewith, and a metallic cross-girder cast integral with the wheel-sides, said girder being formed with upwardly presented sides and a central reinforcing rib on the lower side thereof.

6. A truck comprising wheel-sides, a cross-girder, and a metallic reinforcing channel extending lengthwise of the cross-girder and transversely of the wheel-sides, the wheel-sides, cross-girder and metallic channel constituting a unitary structure.

7. A truck comprising metallic wheel-sides, journal-housings, and a cross-girder formed integral, the cross-girder being povided with a channel-iron cast integral therewith.

8. A truck composed of integral wheel-sides, journal-housings and a cross-girder, the journal-housings being provided with openings in their wheel-sides and adjacent end walls, and members adapted to close the openings in the end walls and a portion of the openings in the wheel-sides of the housings.

9. A truck composed of wheel-sides, journal-housings and a cross-girder cast integral, the cross-girder being formed to provide a chamber extending transversely thereof, and a cover-section or member arranged intermediate of the wheel-sides.

10. A truck formed of metal and composed of wheel-sides having journal-housings and a cross-girder formed integral, the truck being provided with a chamber extending transversely thereof, a cover-section adapted to be secured to the cross-girder, and means for securing the cover-section to the cross-girder and above said chamber.

11. A truck provided with vertically disposed fulcrum levers arranged intermediate of the wheel-sides of the truck, adapted to move lengthwise of the cross-girder and take up the load, and means for yieldingly maintaining the levers in normal position.

12. A truck provided with vertically disposed members arranged intermediate of the wheel-sides of the truck and having rocking engagement with each other so as to move lengthwise of the cross-girder of the truck and adapted to take up the load, and means for yieldingly maintaining the members in normal position.

13. A truck provided with vertically disposed fulcrum levers adapted to take up the load, and cushioning means adapted to receive the end thrust of the levers.

14. A truck provided with vertically disposed members having rocking engagement with each other, and means arranged at the ends of the members for receiving the end thrust of said members.

15. A truck provided with a transversely extending chamber, vertically disposed members adapted to take up the load and arranged to move lengthwise of the chamber, and means for yieldingly maintaining said members in normal position.

16. A truck provided with vertically disposed members having arcuate surfaces adapted to rock upon each other, said members being adapted to take up the load, and means for yieldingly maintaining the abutting ends of said members in an elevated position.

17. A truck provided with a transversely extending chamber, a pair of vertically disposed members mounted in said chamber and having arcuate surfaces arranged to rock upon each other, and means for yieldingly maintaining the abutting ends of said members in an elevated position.

18. A truck provided with a chamber extending transversely thereof, a pair of vertically disposed members mounted in said chamber and having abutting arcuate surfaces adapted to rock upon each other, and means arranged in the ends of said chamber adapted to receive the end thrust of said members.

19. In combination with a bolster and the center plate of a truck, a pair of fulcrum levers adapted to carry the center plate, and means for yieldingly maintaining the inner ends of the fulcrum levers in an elevated position.

20. In combination with a bolster, a pair of fulcrum levers arranged to take up the load applied to the bolster, said levers being mounted on the cross-girder of the truck so as to move through vertically disposed arcs, and means for yieldingly maintaining the abutting ends of the levers in an elevated position.

21. A truck comprising wheel-sides and a cross-girder formed integral, a pair of members mounted on the cross-girder with the abutting ends of said members adapted to rock upon each other, means slidably mounted on the cross-girder adapted to receive the end thrust of said members, and cushioning means for said slidably mounted means.

22. A truck provided with a chamber extending transversely thereof, vertically disposed fulcrum levers mounted in said chamber with their abutting ends adapted to receive the load, slidably mounted means arranged in the chamber at the opposite ends of said levers, and cushioning means arranged intermediate of the last mentioned means and the ends of the chamber.

23. A truck provided with a pair of fulcrum levers, the abutting ends whereof are adapted to receive the load while the free ends are adapted to slide on the cross-girder, means for yieldingly maintaining the abutting ends in an elevated position, means for controlling said fulcrum levers, and cushioning means for the outer or free ends of said levers.

24. A truck provided with side bearings consisting of means having pivotal relation with the bolster so as to oscillate laterally, and cushioning means slidably mounted on the cross-girder of the truck adapted to receive the downward thrust of the side bearings.

25. In combination with a truck and its bolster, side bearings comprising means having pivotal relation with the bolster so as to permit sidewise oscillation, cushioning means arranged on the cross-girder of the truck, and vertically disposed columns intermediate of the first mentioned means and said cushioning means.

26. A truck provided with a bolster having pockets in its under surface at the ends thereof, an antifriction bearing-holding member arranged in each pocket and adapted to have sidewise oscillation, and means for transmitting the downward thrust of the bolster to the cross-girder of the truck.

27. In combination with a truck and its bolster, the latter being provided with pockets at its ends, anti-friction bearing-holding members arranged in each pocket so as to permit sidewise oscillation, and vertically disposed columns intermediate of each holder and the cross-girder of the truck for transmitting a downward pressure from the former to the latter, the upper ends of said columns being arranged in contact with anti-friction bearings in said holding-member.

28. In combination with a truck and its bolster, side bearings comprising an anti-friction bearing-holding member arranged in contact with the under surface of the bolster, the lower surface of said bearing-holding member being provided with a socket, and a telescopic column intermediate of said holding member and the cross-girder of the truck, the upper end of said column being adapted to extend into the socket of the holding member and arranged to have oscillating relation with the lower portion of said column.

29. In combination with a truck and its bolster, means mounted beneath the ends of the bolster and arranged to have side-wise oscillation, and yielding means mounted on the cross-girder of the truck and adapted to receive the downward thrust of the first mentioned means.

30. A truck comprising wheel-sides and a cross-girder cast integral and provided with a chamber extending lengthwise of the cross-girder and transversely of the wheel-sides, load-receiving cushioning means mounted in said chamber, cover-plates for the ends of said chamber, and means for securing said cover-plates in place, said securing means being adapted to constitute transversely extending reinforcing trusses.

31. In a truck, the journal-housings whereof are each provided with a ball and socket bearing to receive the end of the journal, and cushioning means mounted in the journal-housings to receive the vertical thrust.

32. A truck provided with journal-housings open only on the wheel-sides thereof, and anti-friction means mounted in said housings and arranged to receive the ends of the journals.

33. A truck provided with journal-housings open on the wheel-sides thereof while the other or outer sides are closed, a socket member mounted in each journal-housing, and a ball-member arranged in said socket member and adapted to receive the end of the journal and provide central thrust for the end thereof, said ball-member having anti-friction relation with the incased end of the journal.

34. A truck provided with journal-housings open only on the wheel-sides thereof, a sectional socket member or cage mounted in each journal-housing, one section being located on each side of the journal and in engagement with the outer closed end of said housing, a ball-member mounted in said socket member or cage and arranged to receive the end of the journal and provide a central thrust for the journal end, and anti-friction bearings arranged within the ball-member and in contact with the end of the journal.

35. A truck provided with journal-housings closed at the outer sides, socket-means mounted in the housings and composed of two parts disposed on opposite sides of the journal, a spherical member or ball provided with a transverse chamber opening at one side of the ball to receive the end of the journal, the end wall of the chamber being formed to provide a central end-thrust for the journal, and an anti-friction bearing-holding sleeve adapted to fit into said spherical member or ball, the outer end of said sleeve being formed to engage with the end of the anti-friction bearings and with the journal.

36. A truck provided with journal-housings, a two-part socket-member or cage mounted in each journal-housing, one part of said member being arranged on each side of the journal, a ball member mounted in the socket member or cage and provided with an opening to receive the end of the journal, and anti-friction bearing-holding means adapted to extend into the opening in the ball member and about the end of the journal, the outer end of said means being arranged to inclose the ends of the inclosed anti-friction bearings and engage with the journal.

37. A truck provided with journal-housings, a socket member or cage mounted in each journal-housing, a ball member mounted in the socket member or cage and arranged to receive the end of the journal, an anti-friction bearing-holding sleeve adapted to extend into the ball member and encircle the end of the journal, and means for maintaining said members in the journal-housing.

38. A truck provided with journal-housings, ball and socket means mounted in the journal-housings, the ball-portion of said means being arranged to receive the ends of the journals, and cushioning means arranged above the ball and socket means so as to receive the vertical thrust.

39. A truck provided with journal-housings, ball and socket means mounted in said housings, the ball portion of said means being arranged to receive the ends of the journals, cushioning means arranged above the ball and socket means adapted to receive vertical thrusts, and cushioning means arranged intermediate of the ball and socket means and the inner side wall of the journal-housings adapted to receive lateral thrusts.

40. A truck provided with journal-housings, a socket member or cage mounted in each journal-housing, a ball member mounted in the socket member or cage and arranged to receive the end of the journal, an anti-friction bearing-holding sleeve adapted to extend into the ball member and encircle the end of the journal, the outer end of said sleeve being provided with means to prevent entrance of dirt, and means for maintaining said elements in the journal-housing.

41. In combination with a truck and its bolster, side bearings mounted beneath the ends of the bolster and adapted to receive the downward thrust, spring-plate holding members mounted on the cross-girder of the truck, and vertically disposed columns adapted to transmit the pressure from the side bearings to the spring-plate holding members.

42. In combination with a truck and its bolster, side bearings arranged at the ends of the bolster, and cushioning means arranged on the cross-girder of the truck adapted to receive the thrust of the side bearings, said means comprising a holding member or casing, a series of spring-plates mounted in spaced relation to each other in said holding member or casing, and members intermediate of the spring plates adapted to transmit pressure from one plate to the other at the central portion of the plates.

43. A truck provided with integral wheel-sides and a cross girder, a cover-section secured to the cross-girder so as to provide a chamber or channel extending transversely of the truck, said chamber or channel opening at the sides of the truck, cover-plates for said open ends, and means for securing the cover-plates in place, said means being adapted to constitute transversely extending reinforcing trusses.

44. A truck comprising wheel-sides and a cross girder integrally formed, a cover-section for the cross-girder, means for securing the cover-section on the cross-girder in spaced relation thereto so as to provide a chamber or channel extending transversely of the truck and opening at the sides thereof, cover-plates for the ends of the chamber or channel, and means for securing the cover-plates in place, said means being arranged to constitute transversely extending reinforcing trusses.

45. A truck comprising integral wheel-sides and a cross-girder, a cover-section secured on the cross-girder and in spaced relation thereto, said cover-section being provided with a central opening, and a center plate arranged in said opening so as to have vertical play.

46. A truck comprising wheel-sides, journal-housings and a cross-girder all formed of a single piece, and a multiple of truss rods extending transversely of the truck and lengthwise of the wheel-sides.

47. A truck comprising wheel-sides, journal-housings and a cross-girder formed of a single piece, truss rods extending from wheel-side to wheel-side lengthwise of the same, truss cross-girder for reinforcing the wheel-sides, and a cover-section adapted to be secured to the cross-girder.

48. A truck provided with a channel or chamber extending transversely thereof, a pair of toggle levers mounted in said channel or chamber and adapted to receive the load applied to the truck, and yielding means adapted to receive the end thrust of said toggle levers, said yielding means comprising a series of spring-plates held in spaced relation to each other, and a follower member intermediate of the spring-plates for transmitting the pressure to the central portion of said plates.

49. A truck comprising integral wheel-sides and a cross-girder, a cover-section coextensive with the cross-girder and adapted to be secured thereto so as to provide a chamber extending transversely of the truck, and rods extending from side to side of the truck along opposite sides of the cross-girder so as to form trusses for the cross-girder.

50. A truck comprising integrally formed wheel-sides and a cross girder, a cover-section for said cross-girder extending from wheel-side to wheel-side and adapted to be secured to the cross-girder, and a resilient center-bearing mounted on the cross-girder and extending through said cover-section.

51. A truck comprising wheel sides, a cross-girder, a cover-section extending from wheel-side to wheel-side and adapted to be secured to the cross-girder so as to provide a chamber, a resilient centerbearing mounted in said chamber and extending through the cover-section, and means for distributing the stresses laterally.

52. A truck comprising wheel-sides, a cross-girder provided with a chamber extending lengthwise thereof, a cover-section for said chamber adapted to be secured to the cross-girder, resilient bearings mounted in said chamber and arranged to receive the load, means for distributing the stresses on the bearing transversely of the truck, and means extending transversely of the truck for reinforcing the same at the points receiving said lateral stresses.

53. In a truck, ball and socket means mounted in the journal-housings of the truck and adapted to receive the ends of the journals, anti-friction means intermediate of the journal and said first mentioned means, and cushioning means arranged in the journal-housings intermediate of the first mentioned means and the walls of the housings.

54. In a truck, the side bearings whereof comprise an anti-friction bearing-holder or cage provided with an endless race-way for the bearings, said holder or cage being provided with an opening in the lower surface thereof, and a vertically disposed member or column extending through the opening in said holder or cage and in engagement with the anti-friction bearings and arranged to transmit the vertical stresses to the cross-girder of the truck.

55. A truck comprising integrally formed wheel-sides and a cross-girder, a cover-section extending from wheel-side to wheel-side and fixedly secured to the cross-girder, said cover-section being provided with depending portions for maintaining a spaced relation between the cover-section and the cross-girder so as to provide a channel lengthwise of the cross-girder, and a resilient center-bearing mounted on the cross-girder and extending through said cover-section.

56. A truck comprising integrally formed wheel-sides and a cross-girder, a cover-section extending from wheel-side to wheel-side and adapted to be fixedly secured to the cross-girder, the cross-girder and cover-section being so formed as to provide a chamber between extending lengthwise thereof, the cover-section being provided with openings for passage of the center-bearing and side-bearings, the center-bearing and side-bearings being mounted on the cross-girder.

57. A truck provided with a pair of vertically disposed fulcrum levers arranged intermediate of the wheel-sides of the truck and adapted to move lengthwise of the cross-girder to take up the load, the abutting ends of said levers being socketed for passage of a center-pin, and means bearing on the cross-girder of the truck and seated in the socketed ends of said levers whereby the latter are yieldingly maintained in normal elevated position.

58. A truck provided with wheel-sides, a cross-girder, a center-plate mounted above the cross-girder, vertically disposed fulcrum levers arranged intermediate of the wheel-sides of the truck and in sliding engagement with the cross-girder of the truck adapted to take up the load, the adjacent ends of the levers being arranged to rock upon each other and have sliding engagement with the center-plate, and means arranged intermediate of the cross-girder and the adjacent ends of the levers for yieldingly maintaining the latter in normal position.

59. A truck comprising integrally formed wheel-sides and a cross-girder, a cover-section fixedly secured to the cross-girder and in spaced relation thereto so as to provide a chamber between the cover-section and cross-girder, fulcrum levers arranged intermediate of the cover-section and cross-girder and between the wheel-sides, means for yieldingly maintaining said levers in normal elevated position, and means for guiding said levers and to prevent their displacement.

60. A truck comprising integrally formed wheel-sides and a cross-girder, fulcrum levers slidably mounted on the cross-girder, with their adjacent ends adapted to rock upon each other, means mounted on the cross-girder and in operative relation with the adjacent ends of the fulcrum levers for yieldingly maintaining the latter in normal raised position, a center-plate mounted on the elevated adjacent ends of said levers, a center-pin extending through the center-plate, the adjacent ends of said levers and said cross-girder, and means for preventing displacement of the center-pin and said levers.

61. A truck comprising wheel-sides and a cross-girder formed integral, independent reinforcing means cast integral with the cross-girder and extending longitudinally thereof and transversely of the wheel-sides, and reinforcing means extending lengthwise of the wheel-sides and in contact with the bottom of the ends of the reinforcing means in the cross-girder so as to constitute truss-elements.

WILLIAM A. CASWELL.

Witnesses:
GEORGE HEIDMAN.
F. A. FLORELL.